(12) United States Patent
Ford

(10) Patent No.: US 11,187,341 B2
(45) Date of Patent: Nov. 30, 2021

(54) DROP-IN INSERT FOR A VALVE CAGE OF A PUMP

(71) Applicant: Michael Brent Ford, St. George, UT (US)

(72) Inventor: Michael Brent Ford, St. George, UT (US)

( * ) Notice: Subject to any disclaimer, the term of this patent is extended or adjusted under 35 U.S.C. 154(b) by 0 days.

(21) Appl. No.: 17/148,218

(22) Filed: Jan. 13, 2021

(65) Prior Publication Data

US 2021/0246992 A1   Aug. 12, 2021

Related U.S. Application Data

(60) Provisional application No. 62/972,915, filed on Feb. 11, 2020.

(51) Int. Cl.

| | |
|---|---|
| *F16K 15/04* | (2006.01) |
| *F16K 27/02* | (2006.01) |
| *F04B 53/10* | (2006.01) |
| *F04B 47/06* | (2006.01) |
| *E21B 34/06* | (2006.01) |

(52) U.S. Cl.
CPC ...... *F16K 27/0209* (2013.01); *F04B 53/1002* (2013.01); *F16K 15/04* (2013.01); *E21B 34/06* (2013.01); *F04B 47/06* (2013.01)

(58) Field of Classification Search
CPC ... F16K 27/0245; F16K 27/0209; F16K 15/04

USPC .................................................. 137/533.19
See application file for complete search history.

(56) References Cited

U.S. PATENT DOCUMENTS

| | | |
|---|---|---|
| 1,555,068 A | 9/1925 | Nixon |
| 3,503,079 A | 3/1970 | Smith |
| 3,845,781 A | 11/1974 | Hansen et al. |
| 5,178,184 A | 1/1993 | Skillman |
| 6,685,451 B1 | 2/2004 | Ivey |
| 7,069,997 B2 | 7/2006 | Coyes et al. |
| 8,453,673 B2 | 6/2013 | Ford |

*Primary Examiner* — P. Macade Nichols
(74) *Attorney, Agent, or Firm* — Weiss & Moy, P.C.; Karen J. S. Fouts

(57) ABSTRACT

A drop-in insert for a valve cage is adapted for use with a subsurface pump. The insert can be positioned in a valve cage housing. The insert includes a cradle, a base, a plurality of angled ribs, and an upper ring. In one embodiment, the insert may also include an extended nose region. Upper ring can abut an interior diameter of the housing, providing a smooth transition for pumped fluid, thereby decreasing turbulent fluid flow and promoting improved fluid flow during pumping operations. The insert can be dropped into position in the housing. Alternatively, the insert can be positioned in the housing by an interference fit or the like. The housing and insert can be part of a valve cage assembly that includes a ball, seat, seat plug, and end cap. The assembly may include an O-ring component which can cushion the insert, thereby prolonging the life of the insert.

20 Claims, 8 Drawing Sheets

DROP-IN INSERT FOR A VALVE CAGE OF A PUMP

CROSS-REFERENCE TO RELATED APPLICATIONS

This non-provisional application claims priority to U.S. Provisional Application Ser. No. 62/972,915 entitled VALVE CAGE WITH DROP-IN INSERT FOR A PUMP that was filed on Feb. 11, 2020 in the name of the inventor of this non-provisional application and which is hereby incorporated herein by reference. The present application is also related to U.S. Pat. No. 8,453,673, entitled "Valve Cage for a Pump," which was issued on Jun. 4, 2013 in the name of the inventor herein, which is incorporated herein by reference.

TECHNICAL FIELD

The present disclosure generally relates to fluid pumping apparatuses and, more particularly, to a drop-in insert for a valve cage for use with a subsurface pump, that allows for improved flow of fluids during pumping operations.

BACKGROUND

Oil well pumping systems are well known in the art. Such systems can be used to mechanically remove oil or other fluid from beneath the earth's surface, particularly when the natural pressure in an oil well has diminished. Generally, an oil well pumping system can begin with an above-ground pumping unit, which can be commonly referred to as a "pumpjack." The pumping unit can create a reciprocating up and down pumping action that moves the oil or other substance being pumped out of the ground and into a flow line, from which the oil can then be taken to a storage tank or other such structure.

Below the ground, a shaft can be lined with piping known as "tubing." Into the tubing is inserted a string of sucker rods, which ultimately can be indirectly coupled at its north end to the above-ground pumping unit. The string of sucker rods can be indirectly coupled at its south end to a subsurface or "down-hole" pump that is located at or near the fluid in the oil well. The subsurface pump can have a number of basic components, including a barrel and a plunger. The plunger can operate within the barrel, and the barrel, in turn, can be positioned within the tubing. It is common for the barrel to include a standing valve and the plunger to include a traveling valve. The standing valve can have a ball therein, the purpose of which can be to regulate the passage of oil from down-hole into the pump, allowing the pumped matter to be moved northward out of the system and into the flow line, while preventing the pumped matter from dropping back southward into the hole. Oil is permitted to pass through the standing valve and into the pump by the movement of the ball off its seat, and oil is prevented from dropping back into the hole by the seating of the ball. North of the standing valve, coupled to the string of sucker rods, is the traveling valve. The traveling valve can regulate the passage of oil from within the pump northward in the direction of the flow line, while preventing the pumped oil from dropping back southward, in the direction of the standing valve and hole.

Actual movement of the pumped substance through the system will now be discussed. Oil can be pumped from a hole through a series of downstrokes and upstrokes of the pump, which motion can be imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the traveling valve, the ball is located in the seated position, held there by the pressure from the oil that has been previously pumped.

On the downstroke, the ball in the traveling valve unseats, permitting the oil that has passed through the standing valve to pass therethrough. Also during the downstroke, the ball in the standing valve seats, preventing pumped oil from moving back down into the hole. The process repeats itself again and again, with oil essentially being moved in stages from the hole, to above the standing valve and in the oil pump, to above the traveling valve and out of the oil pump. As the oil pump fills, the oil passes through the pump and into the tubing. As the tubing is filled, the oil passes into the flow line, and can then be taken to the storage tank or other such structure.

There are a number of problems that can occur during oil pumping operations. The ball and seat components used in both the traveling valve and the standing valve are exposed to excessive wear as a result of a number of factors. For example, pumps typically allow for the turbulent flow of fluids at high pressures. This turbulent flow promotes wear of pump components. In particular, in conventional pumping systems, the ball is allowed to move uncontrolled in the valve cage, eventually causing damage to both the ball and valve cage. In this regard, while the ball is moving uncontrolled in the valve cage, the fluid must redirect itself and pass by the ball to exit the valve cage. This causes great turbulence and slows the passage of fluid, reducing the volume of fluid that is allowed to pass. As another example, in some typical valve cages, the ball maintains a consistent point of contact with the interior surface of the valve cage during pumping operations. As a result, over time, the action of the ball causes solids to accumulate. Once the solids accumulate, they can prevent the ball from reseating, eventually causing the ball to get stuck in the valve cage. Further, when the pump of conventional pumping systems is in the upstroke, the ball falls randomly and is required to search for the seat area. This action causes damage to the ball and reduces the efficiency of the pump, as the ball takes longer to seat. This can be problematic especially in situations where high amounts of solids are present, as the ball may stick in the cage. As another example, typical valve cage designs can actually further promote turbulent fluid flow, particularly when their configurations do not allow for a smooth transition for the fluid to flow.

Eventually, pump components need to be replaced as a result of being exposed to excessive wear and damage. In the past, valve cages have been equipped with hard liners, in order to increase valve cage life. However, hard liners can be expensive.

In the past, valve cage inserts have been developed that include an upper ring. However, the upper rings of such valve cage inserts typically have flat vertical surfaces that face inwardly toward the moving fluid. This configuration causes extreme turbulence of fluid flow. Turbulent fluid flow can cause undesired adverse effects, such as the creation of eddy currents, which stall fluid movement, creating a reduction in fluid volume across the valve.

A solution to the above-mentioned problems was disclosed in U.S. Pat. No. 8,453,673, which was issued to the inventor herein on Jun. 4, 2013. The valve cage insert disclosed in U.S. Pat. No. 8,453,673 may be used with the valve cage housing disclosed therein, and is configured to be press-fit into the interior diameter of the housing, forming a smooth transition for the fluid. However, with drop-in type valve cage housings, although the valve cage insert disclosed in U.S. Pat. No. 8,453,673 could be positioned in such a drop-in type valve cage housing, it could cause turbulent fluid flow since a smooth transition for the fluid would be lacking without the valve cage insert disclosed therein being press-fit into the interior diameter of the housing. This is also due in part to the fact that the upper portion of the valve cage insert disclosed in U.S. Pat. No. 8,453,673 does not contact the interior diameter of the valve cage housing. Accordingly, the valve cage insert disclosed in U.S. Pat. No. 8,453,673 may not be best-suited for use in a drop-in type valve cage housing.

The present disclosure relates to a drop-in insert for a valve cage for use with a subsurface pump, that allows for improved flow of fluids during pumping operations. It addresses the problems encountered in prior art pumping systems as well as provides other, related advantages.

SUMMARY

In accordance with one embodiment of the present invention, an insert for a valve cage of a pumping apparatus is disclosed. The insert comprises, in combination: a base portion adapted to abut a rim of the valve cage; a cradle portion adapted to releasably retain a ball, wherein the cradle portion is substantially cone-shaped, and wherein the cradle portion includes one circular port centrally positioned proximate a north end of the insert; an upper ring; a plurality of angled ribs, wherein each rib of the plurality of ribs extends rotationally upwards an entire length from the base portion to the cradle portion, the plurality of ribs terminating at an upper surface of the upper ring, wherein the plurality of ribs define lateral channels therebetween; and a plurality of upper channels, wherein each upper channel is defined by an exterior diameter of the cradle portion, an interior diameter of the upper ring, and upper side portions of adjacent ribs; wherein a greatest exterior diameter of the cradle portion is less than a greatest exterior diameter of the base portion; and wherein a greatest exterior diameter of the upper ring is equal to a greatest exterior diameter of the base portion.

In accordance with another embodiment of the present invention, a valve cage for use in a pumping apparatus is disclosed. The valve cage comprises, in combination: a housing having a north end and a south end and a channel running therethrough, wherein a first interior portion of the housing proximate the north end includes a first threaded region, a second interior portion of the housing proximate the south end includes a second threaded region, and a third interior portion of the housing includes an annular rim; and an insert adapted to be positioned in the housing, comprising, in combination: a base portion adapted to abut the rim of the housing, wherein an exterior diameter of the base portion is adapted to abut an interior diameter of the housing; a cradle portion adapted to releasably retain a ball, wherein the cradle portion is substantially cone-shaped, and wherein the cradle portion includes one circular port centrally positioned proximate a north end of the insert; an upper ring, wherein an exterior diameter of the upper ring is adapted to abut the interior diameter of the housing, and wherein an interior diameter of the upper ring is downwardly angled from an upper surface of the upper ring to a lower portion of the upper ring; a plurality of angled ribs, wherein each rib of the plurality of ribs extends rotationally upwards an entire length from the base portion to the cradle portion, the plurality of ribs terminating at an upper surface of the upper ring, wherein the plurality of ribs define lateral channels therebetween; and a plurality of upper channels, wherein each upper channel is defined by an exterior diameter of the cradle portion, an interior diameter of the upper ring, and upper side portions of adjacent ribs; wherein a greatest exterior diameter of the cradle portion is less than a greatest exterior diameter of the base portion; and wherein a greatest exterior diameter of the upper ring is equal to a greatest exterior diameter of the base portion.

In accordance with another embodiment of the present invention, a valve cage assembly is disclosed. The valve cage assembly comprises, in combination: a housing having a north end and a south end and a channel running therethrough, wherein a first interior portion of the housing proximate the north end includes a first threaded region, a second interior portion of the housing proximate the south end includes a second threaded region, and a third interior portion of the housing includes an annular rim; and an insert adapted to be positioned in the housing, comprising, in combination: a base portion adapted to abut the rim of the housing, wherein an exterior diameter of the base portion is adapted to abut an interior diameter of the housing; a cradle portion adapted to releasably retain a ball, wherein the cradle portion is substantially cone-shaped, and wherein the cradle portion includes one circular port centrally positioned proximate a north end of the insert; an upper ring, wherein an exterior diameter of the upper ring is adapted to abut the interior diameter of the housing, and wherein an interior diameter of the upper ring is downwardly angled from an upper surface of the upper ring to a lower portion of the upper ring; a plurality of angled ribs, wherein each rib of the plurality of ribs extends rotationally upwards an entire length from the base portion to the cradle portion, the plurality of ribs terminating at an upper surface of the upper ring, wherein the plurality of ribs define lateral channels therebetween; and a plurality of upper channels, wherein each upper channel is defined by an exterior diameter of the cradle portion, an interior diameter of the upper ring, and upper side portions of adjacent ribs; wherein a greatest exterior diameter of the cradle portion is less than a greatest exterior diameter of the base portion; and wherein a greatest exterior diameter of the upper ring is equal to a greatest exterior diameter of the base portion; an end cap adapted to be coupled to the north end of the housing; a ball adapted to be positioned in the housing; a seat adapted to be positioned in the housing, wherein an upper surface of the seat is adapted to abut a lower surface of the rim; and a seat plug adapted to be coupled to the south end of the housing.

BRIEF DESCRIPTION OF DRAWINGS

The present application is further detailed with respect to the following drawings. These figures are not intended to limit the scope of the present application, but rather, illustrate certain attributes thereof. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use and further objectives and advantages thereof, can be best understood by reference to the following detailed description of illustrative embodiments when read in conjunction with the accompanying drawings, wherein.

DESCRIPTION OF THE DISCLOSURE

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

FIGS. 1-13, together, disclose embodiments of a drop-in insert 30 (hereinafter "insert 30") for a valve cage device 10 (hereinafter "valve cage 10") and related components of the present invention. The insert 30 for the valve cage 10 is adapted to be used with a pumping system, such as an oil pumping system, that is positioned within a pump barrel. Although the term "oil" is used herein, it should be understood that the valve cage 10 of the present invention may be used in pumping systems that pump fluids other than oil, such as debris-containing water. In describing the structure of the valve cage 10 and its operation (as well as other pump components discussed herein), the terms "north" and "south" are utilized. The term "north" is intended to refer to that end of the pumping system that is more proximate the pumping unit, while the term "south" refers to that end of the system that is more distal the pumping unit, or "downhole."

Figure 6:
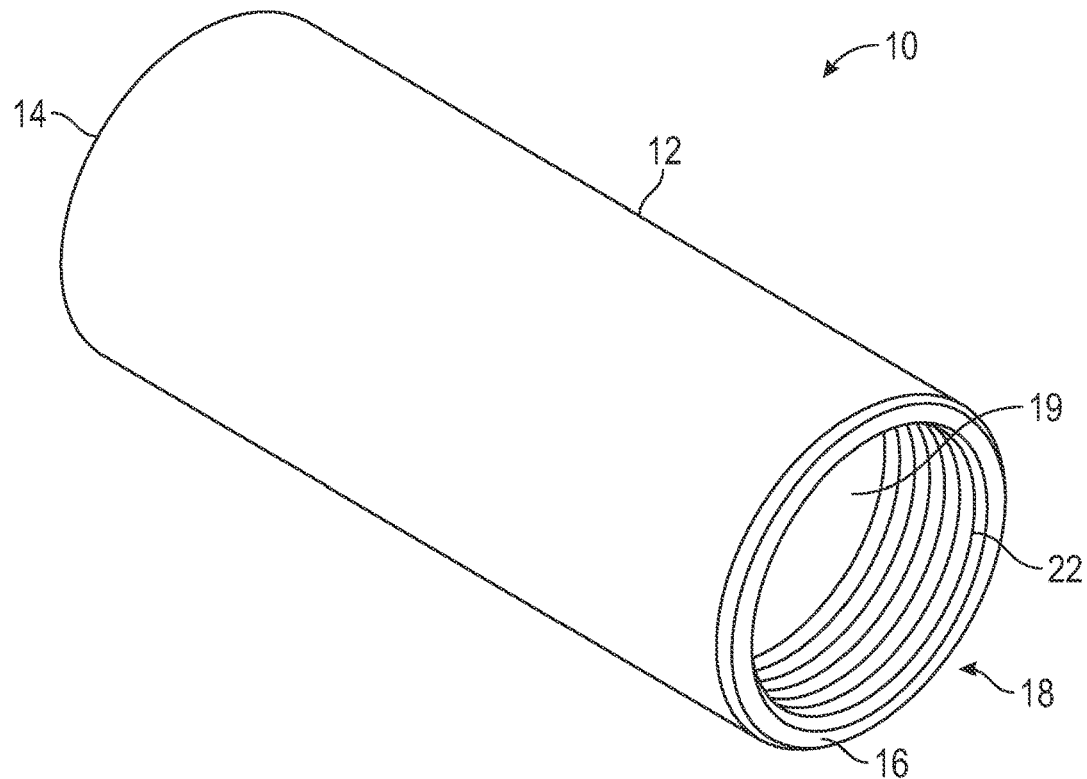
FIG. 6 is a perspective view of a valve cage device, in accordance with one aspect of the present disclosure.
Figure 7:
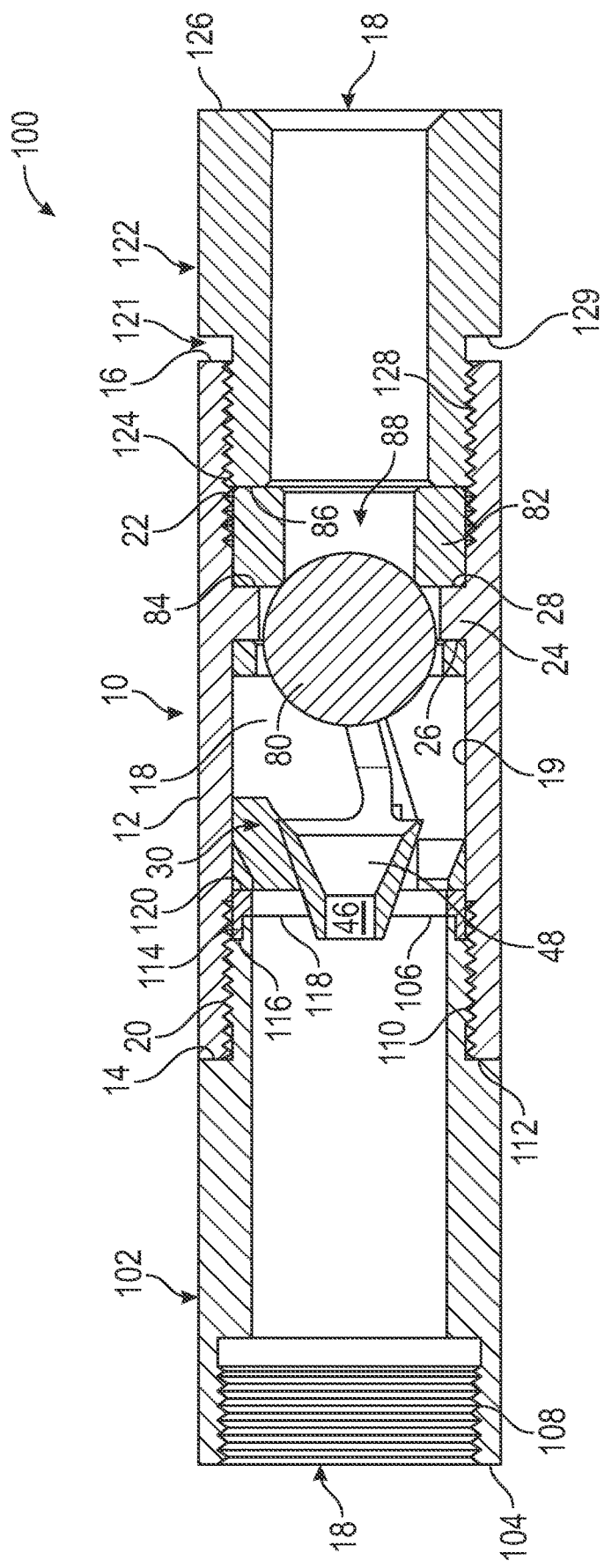
FIG. 7 is a side, cross-sectional view of a valve cage assembly, in accordance with one aspect of the present disclosure.
Figure 8:
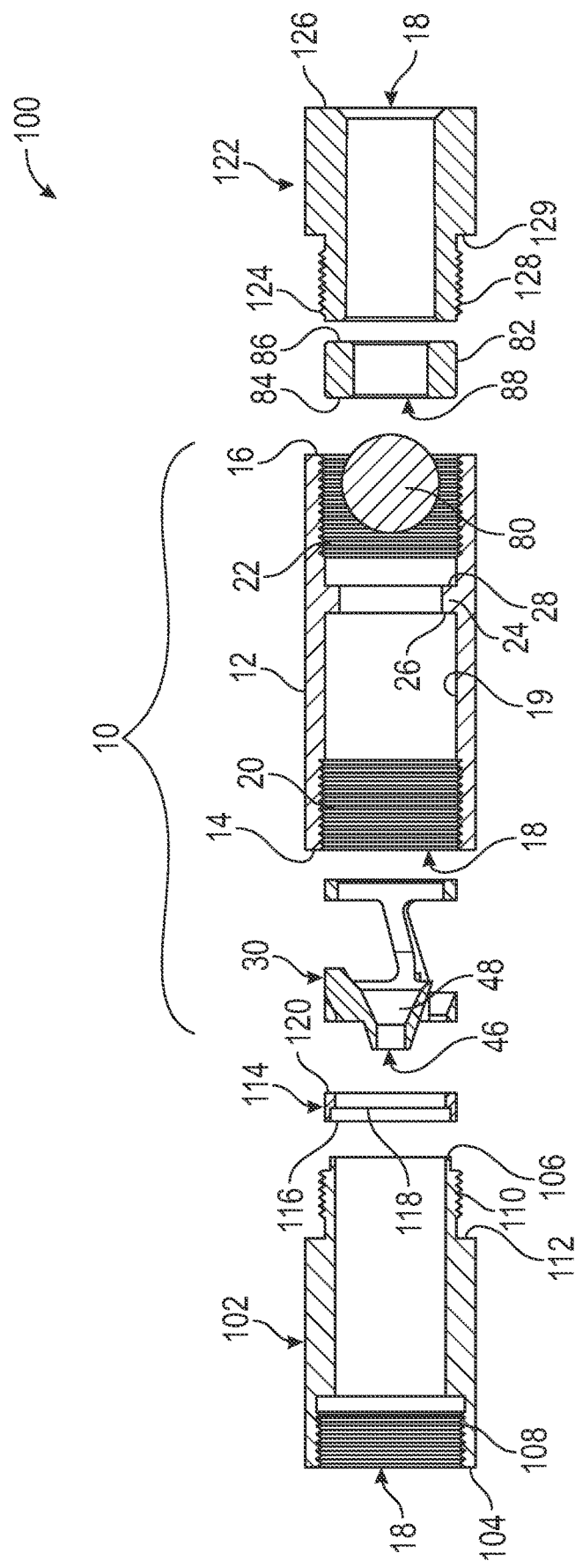
FIG. 8 is a side, cross-sectional, exploded view of the valve cage assembly of FIG. 7.

Referring first to FIGS. 6-8, an embodiment of the valve cage 10 of the present invention is shown. (In FIGS. 7-8, the valve cage 10 is depicted as part of an overall valve cage assembly 100, as further discussed herein.) The valve cage 10, which has a substantially cylindrical external configuration, may generally comprise the following basic components: a cage or housing 12 (hereinafter "housing 12") and a drop-in insert 30 (as shown in FIGS. 7-8, for example) adapted to be positioned within the housing 12. The valve cage 10 may be composed of a hardened material, such as carbide, an alloy or some other suitable material capable of withstanding conditions present in typical oil well environments. In accordance with one embodiment, the valve cage 10 may be configured as a traveling valve cage. In accordance with another embodiment, the valve cage 10 may be configured as a standing valve cage.

Referring still to FIGS. 6-8, the housing 12 will be discussed in further detail. As seen in this embodiment, the overall configuration of the housing 12 is substantially tubular. A longitudinal channel 18 runs through the housing 12, such that the housing 12 is adapted to receive insert 30 therein. An interior diameter 19 of the housing 12 is configured to correspond to outer dimensions of the insert 30, as discussed further herein. The valve cage 10 includes a north end 14 and a south end 16. Referring to FIGS. 7 and 8, an interior portion of the housing 12 proximate the north end 14 preferably includes a threaded region 20, such that the north end 14 of the valve cage 10 may be coupled to a southern portion of an end cap 102. In another embodiment, the north end 14 of the valve cage 10 may be coupled to a various type of pump component, such as a conventional pump plunger (not shown), or the like. Similarly, an interior portion of the housing 12 proximate the south end 16 preferably includes a threaded region 22, such that the south end 16 of the valve cage 10 may be coupled to a conventional seat plug 122 or the like. The threaded regions 20 and 22 may comprise either male or female threading configurations, as desired, as long as they correspond to the configurations of the threaded regions to which they are configured to be coupled.

Referring still to FIGS. 7 and 8, also in an interior portion of the housing 12 is an annular rim 24. The rim 24 is preferably positioned proximate threaded region 22. The rim 24 is preferably substantially squared-off and has a flat upper surface 26 and a flat lower surface 28. In this way, when the insert 30 is positioned in the housing 12, a southern portion of the insert 30 may abut the upper surface 26 of the rim 24, as further discussed herein. Further, when a conventional seat 82 is positioned in the housing 12, a northern portion of the seat 82 may abut the lower surface 28 of the rim 24, as further discussed herein. As seen in this embodiment, preferably the rim 24 has an interior diameter that is less than the diameter of threaded region 22.

Figure 1:
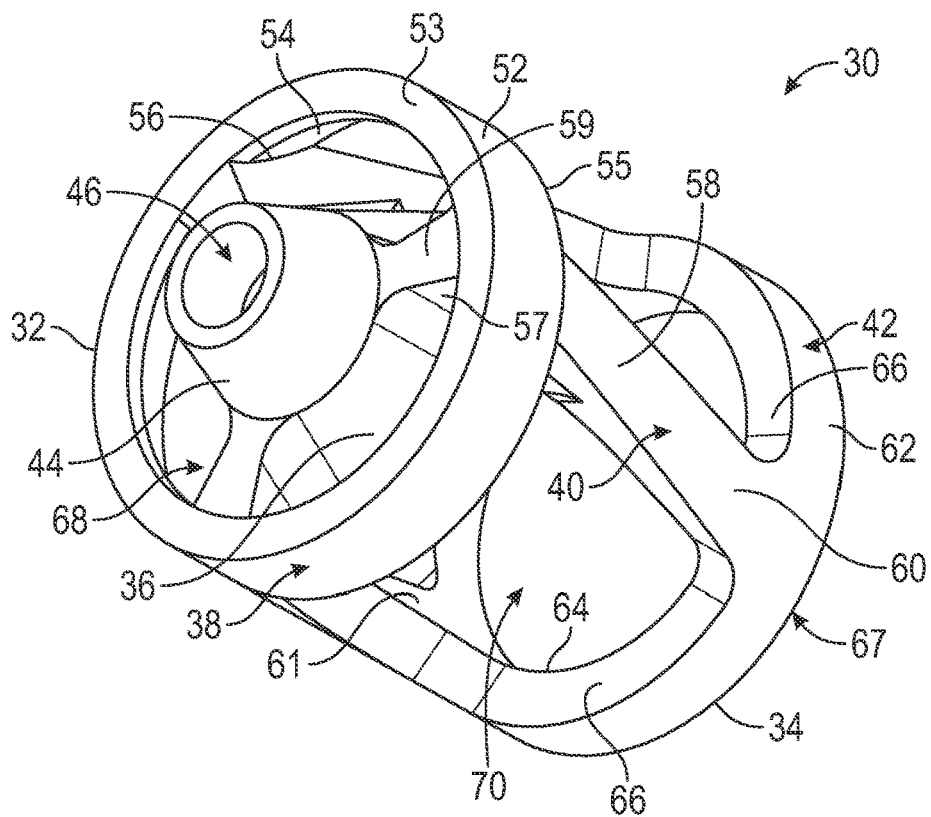
FIG. 1 is a perspective view of an insert for a valve cage device, in accordance with one aspect of the present disclosure.
Figure 2:
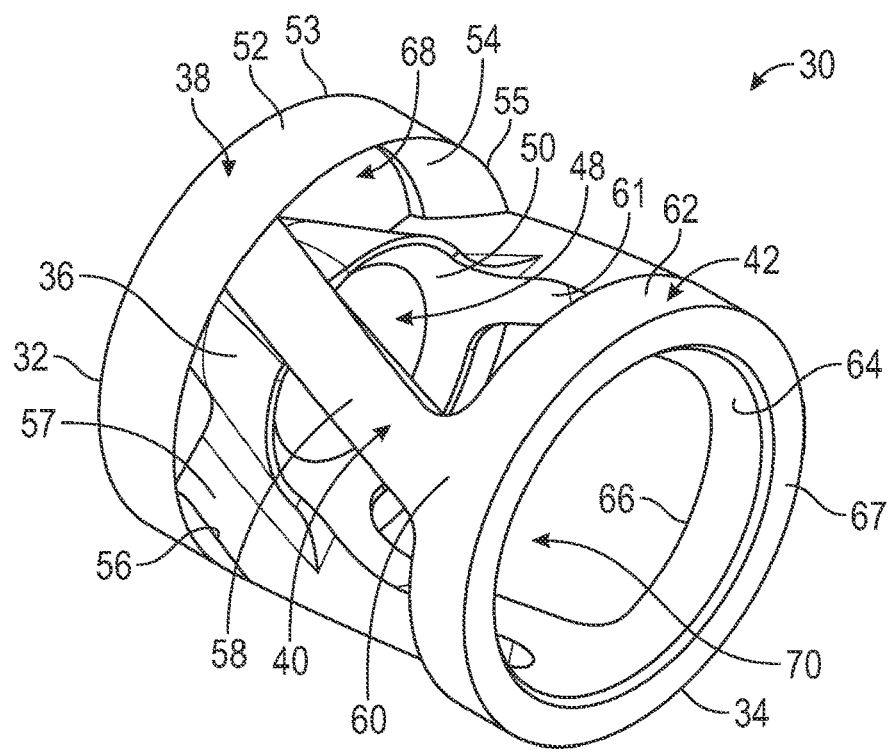
FIG. 2 is another perspective view of the insert of FIG. 1.
Figure 3:
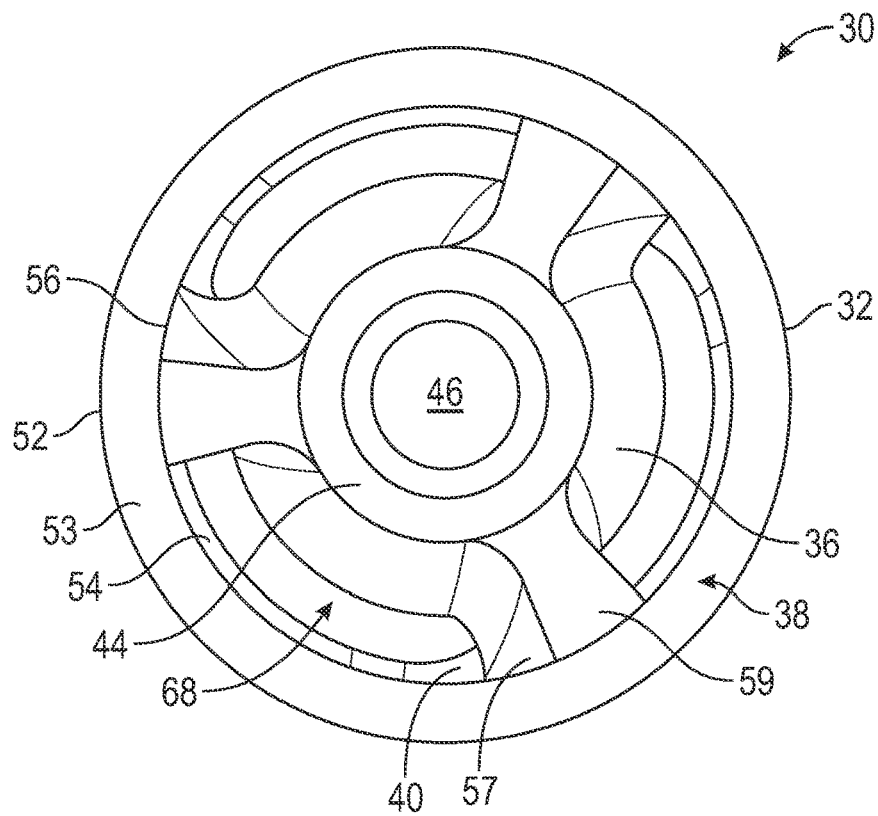
FIG. 3 is a top view of the insert of FIG. 1.
Figure 4:
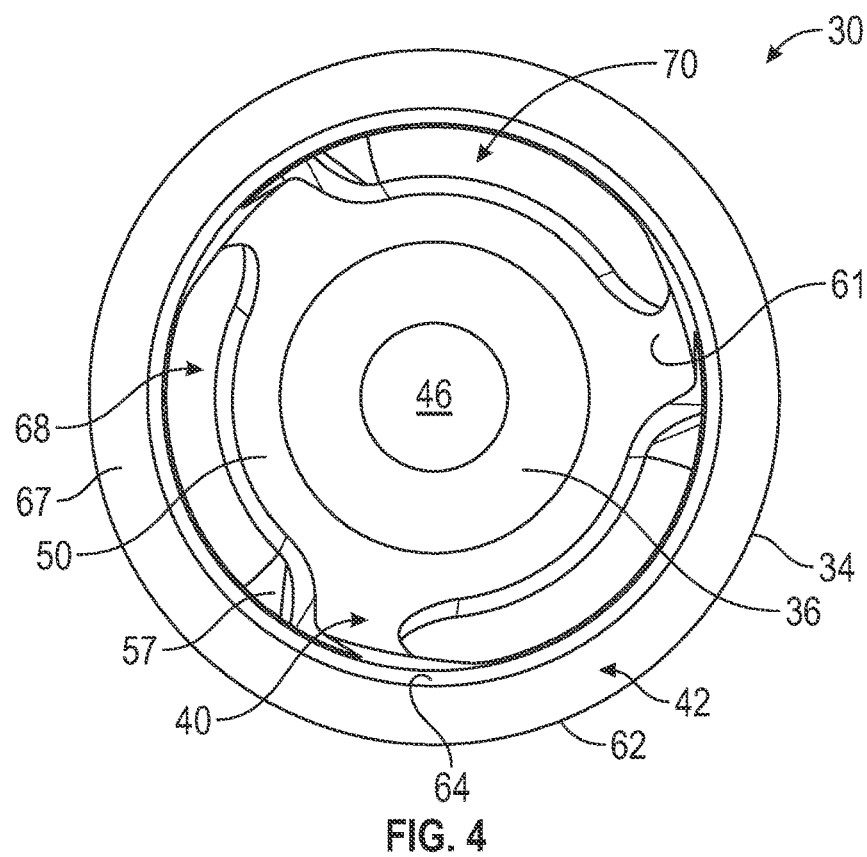
FIG. 4 is a bottom view of the insert of FIG. 1.
Figure 5:
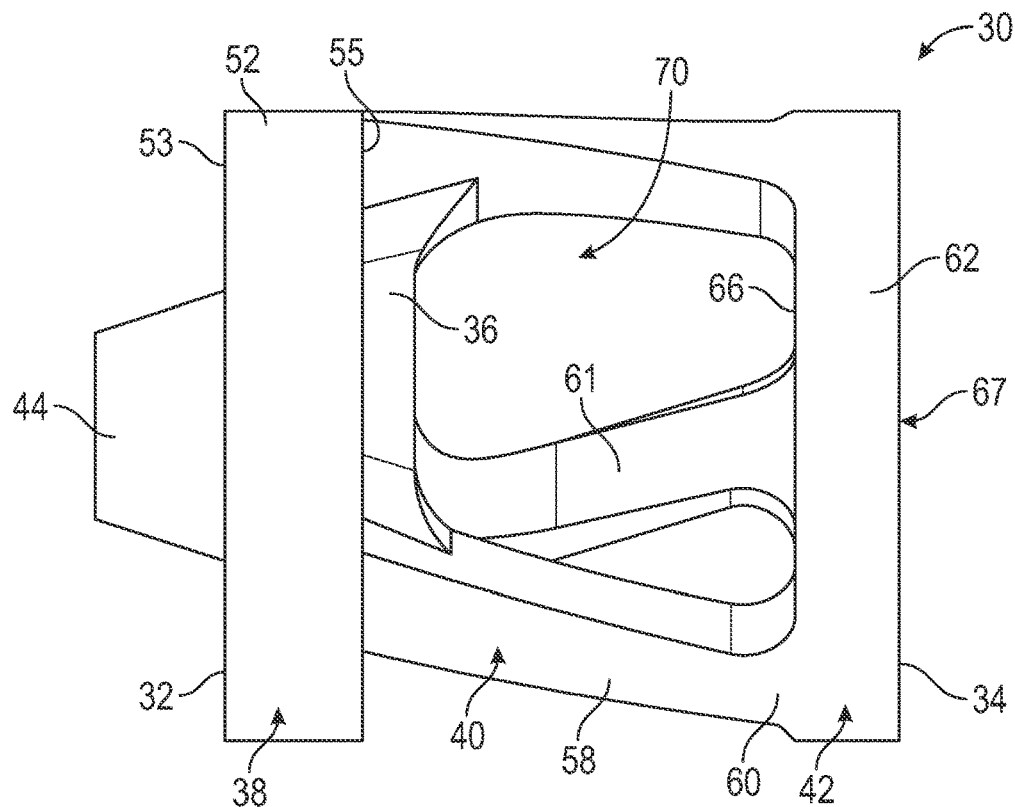
FIG. 5 is a side view of the insert of FIG. 1.

Referring now to FIGS. 1-5 and 7-8, the insert 30 is shown in detail. Turning first to FIGS. 1, 2 and 5, it can be seen that the insert 30 comprises the following main components, beginning from a north end 32 to a south end 34: a cradle 36, an upper ring 38, a plurality of ribs 40, and a base 42. The insert 30 is adapted to be positioned in the housing 12 of the valve cage 10, such that outer portions of the insert 30 abut interior portions of the housing 12. In one embodiment, the insert 30 can be configured to easily slide into position in the housing 12 by being "dropped" into place in the housing 12. In another embodiment, the insert 30 can be held in place in the housing 12 by an interference fit, sonic welding, or the like, as further discussed herein.

Beginning with the cradle 36, it is substantially cone-shaped. The cradle 36 includes an extended nose region 44 at an upper end thereof and an annular shoulder 50 at a lower end thereof. As seen in the embodiment in FIGS. 1, 5, 7, and 8, preferably, the nose region 44 tapers upwardly. The cradle 36 further includes a port 46, as shown in FIGS. 1, 3, 4, 7 and 8. In a preferred embodiment, port 46 is circular. The port 46 is preferably centrally positioned proximate the north end 32 of the insert 36, commencing at an upper portion of the cradle 36, continuing through the nose region 44, and terminating at a north end of the nose region 44. The shoulder 50 is preferably positioned circumferentially along an interior portion of the cradle 36, as seen in FIGS. 2 and 4. Preferably, the shoulder 50 has a curvature that corresponds to an outer curvature of a ball, such as the alternate pattern ball 80 (hereinafter "ball 80"), as shown in FIGS. 7-8 or another conventional ball. In this way, the shoulder 50 is adapted to receive and releasably retain the ball 80 during pumping operations. With the configuration of the cradle 36, when the shoulder 50 receives the ball 80, the ball 80 is prevented from traveling further upwardly into the nose region 44 of the cradle 36. In this way, an open area 48, which is juxtaposed between the nose region 44 and shoulder 50, remains between the nose region 44 and the ball 80 when the ball 80 is received by the shoulder 50. This open area 48 allows for additional energy to be employed in the area of the cradle 36 during pumping operations, in that the open area 48 allows for additional pounds of pressure per square inch which, in turn, helps push the ball 80 off the cradle 36 during pumping operations. During pumping operations, when the pump is in an upward motion and the ball 80 has been released from the shoulder 50, fluid that is being pumped may pass through the port 46.

Turning now to the upper ring 38, as can be seen from a review of FIGS. 1-5, upper ring 38 includes an outer diameter 52, an upper surface 53, an interior diameter 54, and a lower portion 55. In this embodiment, outer diameter 52 has a cylindrical configuration. In this way, outer diameter 52 is configured to correspond to the interior diameter 19 of housing 12 (as seen for example in FIG. 7). Interior diameter 54 is preferably angled downwardly from the upper surface 53 to the lower portion 55 of upper ring 38. Preferably, the downward angle of the interior diameter 54 corresponds to an angle of an exterior surface of the cradle 36, such that the exterior surface of the cradle 36 and interior diameter 54 of the upper ring 38 are substantially parallel with one another. In this way, during pumping operations, with the angling of the upper ring 38 and the angling of the exterior surface of the cradle 36, the pumped fluid is directed upwardly through a plurality of upper channels 68 and, thereafter, further upward through the pumping system. As seen in this embodiment, upper channels 68 are positioned between and defined by the exterior diameter of cradle 36, interior diameter 54 of upper ring 38, and upper side portions 57 of adjacent ribs 40.

As seen in this embodiment, upper ring 38 can vary in thickness from its upper surface 53 to its lower portion 55, with the upper surface 53 having a thickness that is greater than a thickness of the lower portion 55, such that the interior diameter 54 is downwardly tapered. Upper surface 53 is preferably flat. In this way, when insert 30 is positioned in the housing 12, upper surface 53 is configured to abut a southern portion of an O-ring component 114 (see FIG. 7-8) or the like when the valve cage 10 is part of an overall valve cage assembly 100, as further discussed herein.

The positioning and configuration of the upper ring 38 provides one or more advantages. In this regard, upper surface 53 of upper ring 38 abuts O-ring component 114 (see FIGS. 7-8) and outer diameter 52 abuts the interior diameter 19 of housing 12 (see FIGS. 6-8) when insert 30 is positioned in the housing 12. Upper ring 38 thus provides for a smooth transition for the pumped fluid, which is directed upwardly through upper channels 68 of the insert 30. This is in contrast to prior art valve cage inserts that have ribs but lack an upper ring. When such prior art valve cage inserts are utilized in a conventional valve cage, the ribs are permitted to abut the interior diameter of the valve cage housing, but would cause turbulent fluid flow since there is no smooth transition for the fluid. This is also in contrast to prior art valve cage inserts that do have an upper ring. The upper rings of such valve cage inserts typically have flat vertical surfaces that face inwardly toward the moving fluid. This configuration causes extreme turbulence of fluid flow. Turbulent fluid flow can cause undesired adverse effects, such as the creation of eddy currents, which stall fluid movement, creating a reduction in fluid volume across the valve. Thus, upper ring 38 allows the pumped fluid to move smoothly across the upper section of the insert 30 without the adverse effect of fluid turbulence.

Turning now to the ribs 40, each rib 40 can include an upper, outer portion 56, an upper, side portion 57, an intermediate portion 58, an upper surface 59, a lower portion 60, and an interior surface 61. In this embodiment, the upper, outer portion 56 of each rib is downwardly angled to correspond to the downward angle of and mate with the interior diameter 54 of the upper ring 38. The upper surface 59 of each rib 40 is coplanar with the upper surface 53 of the upper ring 38. The ribs 40 of the insert 30 extend upwardly from the base 42 to the cradle 36. In this embodiment, the ribs 40 terminate at the north end 32 of the insert 30. In a preferred embodiment, where the insert 30 is utilized in pumping operations in the earth's northern hemisphere, the ribs 40 extend upwardly from the base 42 to the cradle 36 in a clockwise rotational direction at approximately 30 degrees. In another preferred embodiment, where the insert 30 is utilized in pumping operations in the earth's southern hemisphere, the ribs 40 extend upwardly from the base 42 to the cradle 36 in a counterclockwise rotational direction at approximately 30 degrees. This clockwise rotational orientation of the ribs in the northern hemisphere and counterclockwise rotational orientation of the ribs in the southern hemisphere directs the pumped fluid to correspond with the Coriolis Effect caused by the earth's rotation. It should be understood that the orientation and angling of the ribs 40 may deviate from these configurations, as may be needed depending on the conditions and configurations where the insert 30 is employed.

As seen in this embodiment, the ribs 40 may protrude from the exterior of the cradle 36. Adjacent ribs 40 define lateral channels 70 therebetween. As seen in this embodiment, preferably, the width of the channels 70 is greater than the width of the ribs 40. In one embodiment, the channels 70 may have a width that is approximately five times greater than a width of the ribs 40. The channels 70 provide a passageway for fluid that is being pumped. Preferably, and as seen in this embodiment, the ribs 40, and accordingly the channels 70, are angled, thereby providing an overall radial configuration of the insert 30. In this way, as compared with prior art valve cages, a more laminar flow of fluid may be accomplished. This allows fluid to have passage through a space that is greater than a width of a conventional seat opening 88 (see FIGS. 7-8), thereby providing improved passage through the valve cage 10, compared with prior art valve cages. In a preferred embodiment, three ribs 40 are employed, but a different number of ribs 40 could be used, as desired. Preferably, as shown in this embodiment, the ribs 40 are equidistantly spaced apart. In this embodiment, the lower portion 60 of each rib 40 has a curved configuration where each rib 40 meets with an upper surface 66 of the base 42. However, it should be understood that the lower portion 60 of each rib can have a straight configuration, as may be desired. Preferably, the interior surface 61 of each rib 40 (as shown in FIGS. 1, 2, and 4, for example) has a concave curvature that is configured to correspond to the curvature of the ball 80.

The base 42, as seen in this embodiment, is substantially ring-shaped. The base 42 can include an outer diameter 62, an interior diameter 64, an upper surface 66, and a lower surface 67. The lower surface 67 of the base 42 is adapted to abut the upper surface 26 of the rim 24 of the housing 12

(see FIG. 7). Preferably, the height of the base 42 is less than the height of the cradle 36. Further, as seen in this embodiment, the height of the base 42 can be slightly less than the height of the upper ring 38. During pumping operations, when the ball 80 is released from the shoulder 50 of the cradle 36, the ball 80 should fall straight downward onto the seat 82, guided by the insert 30. This allows for faster seating of the ball 80 compared with prior art designs, thereby reducing pump stroke loss and providing for more efficient pumping.

As shown in the embodiment in FIGS. 1 and 2, for example, preferably the cradle 36 has an exterior diameter that is less than an exterior diameter of the base 42. Further, preferably the cradle 36 has an interior diameter that is less than an interior diameter of the base 42. In this way, the interior diameters of the insert 30 from the interior diameter 64 of the base 42 through the interior diameter of the cradle 36 have an overall tapered configuration. Coupled with the angling of the ribs 40, this tapering is helpful particularly when solids begin to accumulate on the ball 80 during pumping operations. In this regard, even when solids accumulate on the ball 80, the ball 80 should fall freely back onto the seat 82. Further, the ball 80 makes contact with the ribs 40. With the angling of the ribs 40, as the ball 80 falls from the direction of the cradle 36 to the seat 82, the point of contact of the ball 80 with the ribs 40 changes, helping to prevent solids from accumulating and, thereby, from causing the ball 80 to stick. This is an advantage over typical prior art valve cages in which the interior diameters of the inserts thereof are not tapered and do not have angled ribs. With such typical prior art valve cages, solids are permitted to stack up during pumping operations and eventually wedge themselves against the ball 80, thereby preventing the ball 80 from reseating.

Regarding the exterior dimensions of the insert 30, as shown in the embodiments in FIGS. 1 and 2, for example, preferably the upper ring 38 has an outer diameter 52 that is the same as an outer diameter 62 of the base 42. Further, preferably the intermediate portion 58 of each rib 40 is flush with the outer diameter 52 of the upper ring 38 and the outer diameter 62 of the base 42. In this way, the exterior dimensions of the insert 30 from the upper ring 38 to the base 42 are substantially uniform. This further facilitates the insert 30 being held in position horizontally within the housing 12, since the exterior portions of the upper ring 38, ribs 40, and base 42 can abut interior portions of the housing 12.

When the insert 30 is employed in the valve cage 10 that is configured as a traveling valve, the shoulder 50 of the cradle 36 retains the ball 80 when the pump is in a downward motion. This allows the ball 80 to be held calmly in position, thereby allowing fluid to pass freely through channels 70 and 68 and around the ball 80 with ease. With the ball 80 being held calmly in position, violent action of the ball 80 is eliminated, thereby obviating a need for a hard liner to be included in the valve cage 10, unlike typical prior art valve cages. During pumping operations, when the pump is in an upward motion and the ball 80 has been released from the shoulder 50 of the cradle 36, fluid that is being pumped may pass through open area 48 and outward through port 46.

When the insert 36 is employed in the valve cage 10 that is configured as a standing valve, during pumping operations, when the pump is in an upward motion, the ball 80 moves upward into the shoulder 50 of the cradle 36, and the shoulder 50 retains the ball 80. This allows the ball 80 to be held calmly in position, thereby allowing fluid to pass freely through channels 70 and 68 and around the ball 80 with ease. With the ball 80 being held calmly in position, violent action of the ball 80 is eliminated, thereby obviating a need for a hard liner to be included in the valve cage 10, unlike typical prior art valve cages. During pumping operations, when the pump is in a downward motion, the ball 80 is released from the shoulder 50 of the cradle 36, and fluid that is being pumped may pass through open area 48 and outward through port 46.

Turning now to FIGS. 9-13, another embodiment of a drop-in insert, hereinafter "insert 130" is shown. The insert 130 is adapted to be a component of the valve cage 10 and can be employed as an alternative to the insert 30. Generally, the insert 130 is configured similarly to the insert 30, with the exception of the cradle 136 of the insert 130 in which, unlike the insert 30, an extended nose region 44 is omitted.

Figure 9:
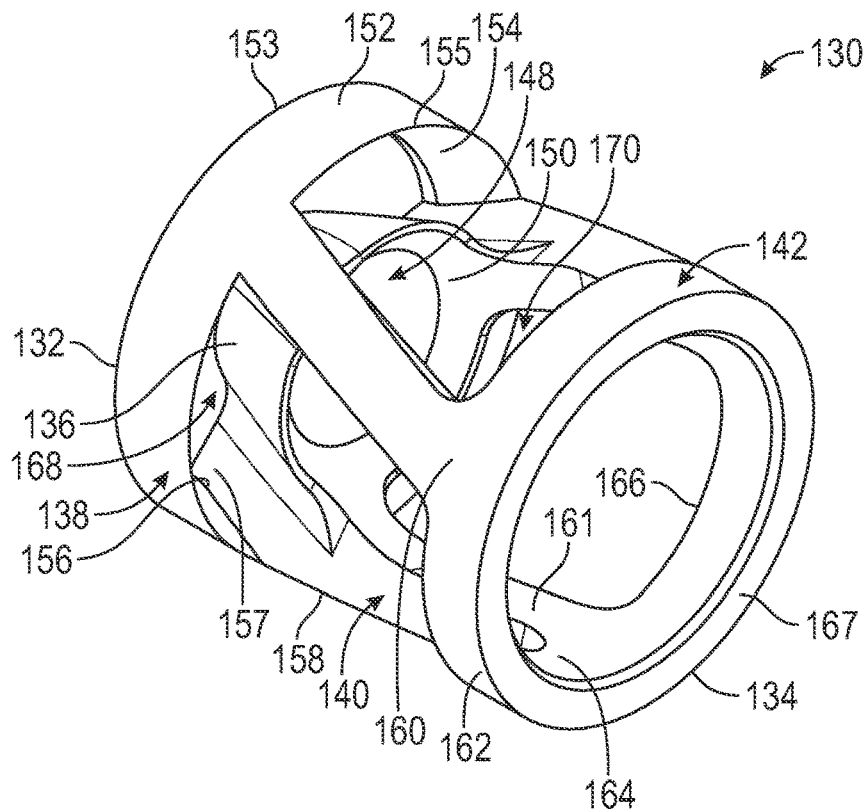
FIG. 9 is a perspective view of an insert for a valve cage device, in accordance with one aspect of the present disclosure.
Figure 10:
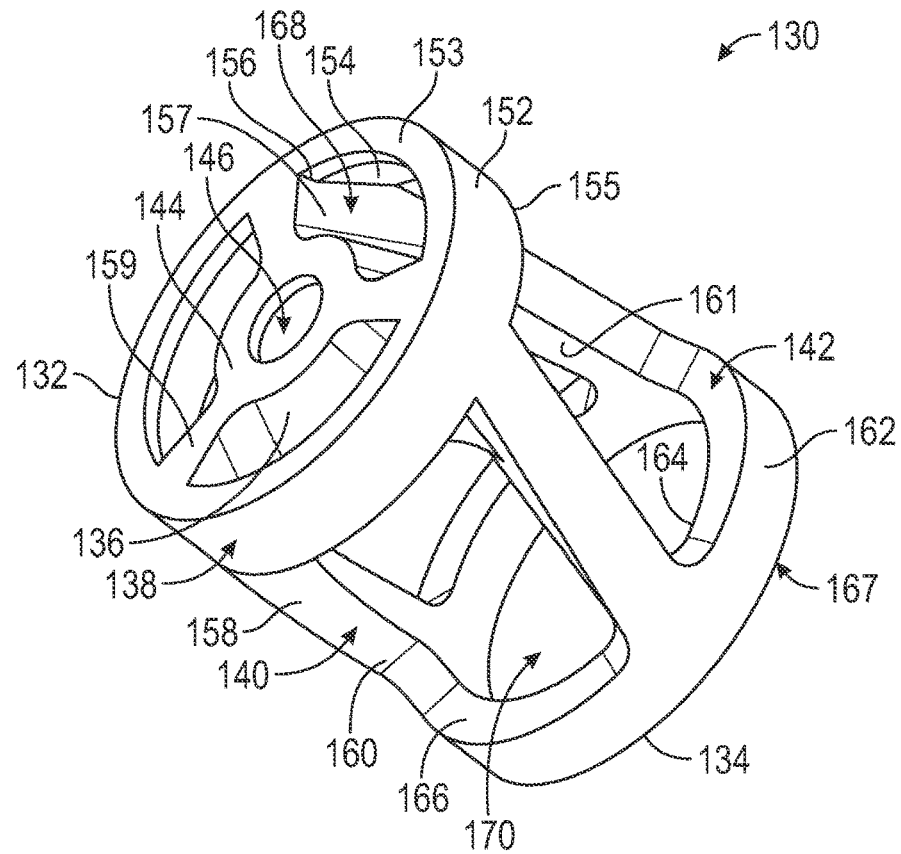
FIG. 10 is another perspective view of the insert of FIG. 9.
Figure 13:
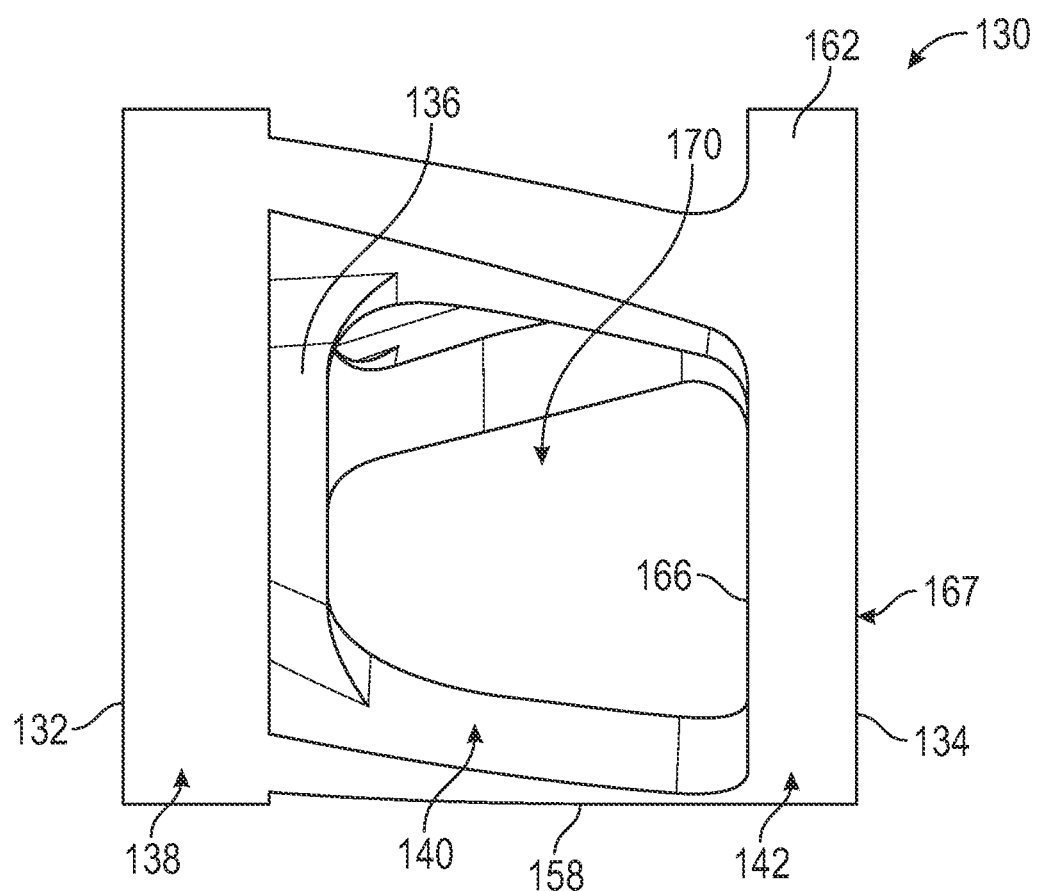
FIG. 13 is a side view of the insert of FIG. 9.

Turning first to FIGS. 9, 10 and 13, it can be seen that the insert 130 comprises the following main components, beginning from a north end 132 to a south end 134: a cradle 136, an upper ring 138, a plurality of ribs 140, and a base 142. As with the insert 30, the insert 130 is adapted to be positioned in the housing 12 of the valve cage 10, such that outer portions of the insert 130 abut inner portions of the housing 12. In one embodiment, the insert 130 can be configured to easily slide into position in the housing 12 by being "dropped" into place in the housing 12. In another embodiment, the insert 130 can be held in place in the housing 12 by an interference fit, sonic welding, or the like, as further discussed herein.

Figure 11:
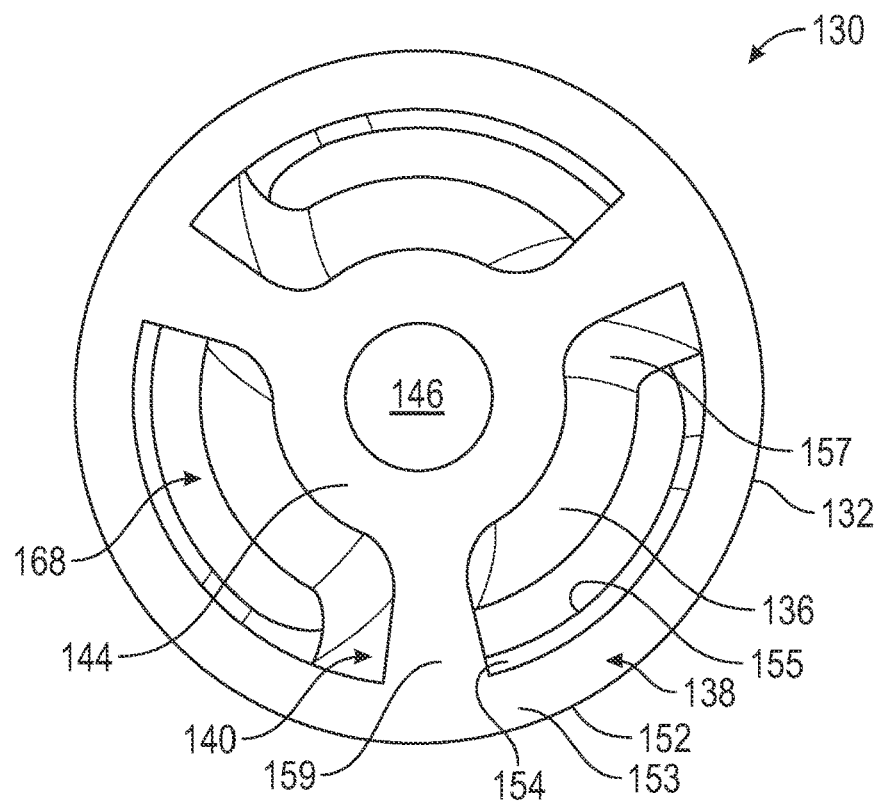
FIG. 11 is a top view of the insert of FIG. 9.
Figure 12:
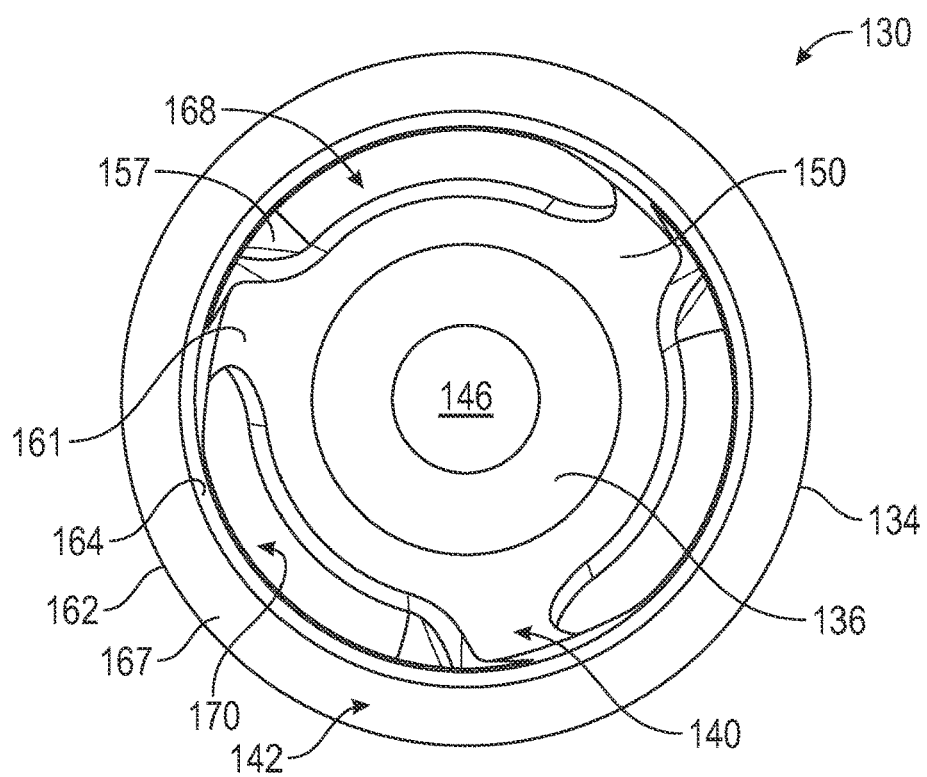
FIG. 12 is a bottom view of the insert of FIG. 9.

Beginning with the cradle 136, it is substantially cone-shaped. Unlike the insert 30, in this embodiment, the cradle 136 includes a flat upper surface 144, which is coplanar with an upper surface 159 of each rib 140, as discussed further herein. An annular shoulder 150 is provided at a lower end of the cradle 130 (see FIGS. 9 and 12). The cradle 136 further includes a port 146, as shown in FIGS. 10-12. In a preferred embodiment, port 146 is circular. The port 146 is preferably centrally positioned proximate the north end 132 of the insert 130. The shoulder 150 is preferably positioned circumferentially along an interior portion of the cradle 136, as seen in FIGS. 9 and 12. Preferably, the shoulder 150 has a curvature that corresponds to an outer curvature of a ball, such as the ball 80, as shown in FIGS. 7-8 or another conventional ball. In this way, the shoulder 150 is adapted to receive and releasably retain the ball 80 during pumping operations. With the configuration of the cradle 136, when the shoulder 150 receives the ball 80, the ball 80 is prevented from traveling further upwardly above the shoulder 150 of the cradle 136. In this way, an open area 148, which is juxtaposed between upper surface 144 and shoulder 150, remains between upper surface 144 and the ball 80 when the ball 80 is received by the shoulder 150. This open area 148 allows for additional energy to be employed in the area of the cradle 136 during pumping operations, in that the open area 148 allows for additional pounds of pressure per square inch which, in turn, helps push the ball 80 off the cradle 136 during pumping operations. During pumping operations, when the pump is in an upward motion and the ball 80 has been released from the shoulder 150, fluid that is being pumped may pass through the port 146.

Turning now to the upper ring 138, as can be seen from a review of FIGS. 9-11 and 13, upper ring 138 includes an outer diameter 152, an upper surface 153, an interior diameter 154, and a lower portion 155. In this embodiment, outer diameter 152 has a cylindrical configuration. In this way, outer diameter 152 is configured to correspond to the interior diameter 19 of housing 12. Interior diameter 154 is preferably angled downwardly from the upper surface 153 to the lower portion 155 of upper ring 138. Preferably, the downward angle of the interior diameter 154 corresponds to an angle of an exterior surface of the cradle 136, such that the exterior surface of the cradle 136 and interior diameter 154 of the upper ring 138 are substantially parallel with one another. In this way, during pumping operations, with the angling of the upper ring 138 and the angling of the exterior surface of the cradle 136, the pumped fluid is directed upwardly through a plurality of upper channels 168 and, thereafter, further upward through the pumping system. As seen in this embodiment, upper channels 168 are positioned between and defined by the exterior diameter of cradle 136, interior diameter 154 of upper ring 138, and upper side portions 157 of adjacent ribs 140.

As seen in this embodiment, upper ring 138 can vary in thickness from its upper surface 153 to its lower portion 155, with the upper surface 153 having a thickness that is greater than a thickness of the lower portion 155, such that the interior diameter 154 is downwardly tapered. Upper surface 153 is preferably flat. In this way, when insert 130 is positioned in the housing 12, upper surface 153 is configured to abut a southern portion of an O-ring component 114 (see FIGS. 7-8) or the like when the valve cage 10 is part of an overall valve cage assembly 100, as further discussed herein. As seen in this embodiment, upper surface 153 is coplanar with upper surface 144 of the cradle 136.

The positioning and configuration of the upper ring 138 provides one or more advantages. In this regard, upper surface 153 of upper ring 138 abuts O-ring component 114 (see FIGS. 7-8) and outer diameter 152 abuts the interior diameter 19 of housing 12 (see FIGS. 6-8) when insert 130 is positioned in the housing 12. Upper ring 138 thus provides for a smooth transition for the pumped fluid, which is directed upwardly through upper channels 168 of the insert 130. This is in contrast to prior art valve cage inserts that have ribs but lack an upper ring. When such prior art valve cage inserts are utilized in a conventional valve cage, the ribs are permitted to abut the interior diameter of the valve cage housing, but would cause turbulent fluid flow since there is no smooth transition for the fluid. This is also in contrast to prior art valve cage inserts that do have an upper ring. The upper rings of such valve cage inserts typically have flat vertical surfaces that face inwardly toward the moving fluid. This configuration causes extreme turbulence of fluid flow. Turbulent fluid flow can cause undesired adverse effects, such as the creation of eddy currents, which stall fluid movement, creating a reduction in fluid volume across the valve. Thus, upper ring 138 allows the pumped fluid to move smoothly across the upper section of the insert 130 without the adverse effect of fluid turbulence.

Turning now to the ribs 140, each rib 140 can include an upper, outer portion 156, an upper, side portion 157, an intermediate portion 158, an upper surface 159, a lower portion 160, and an interior surface 161. In this embodiment, the upper, outer portion 156 of each rib is downwardly angled to correspond to the downward angle of and mate with the interior diameter 154 of the upper ring 138. The upper surface 159 of each rib is coplanar with upper surface 144 of the cradle 136 and upper surface 153 of the upper ring 138. The ribs 140 of the insert 130 extend upwardly from the base 142 to the cradle 136. In this embodiment, the ribs 140 terminate at the north end 132 of the insert 130. In a preferred embodiment, where the insert 130 is utilized in pumping operations in the earth's northern hemisphere, the ribs 140 extend upwardly from the base 142 to the cradle 136 in a clockwise rotational direction at approximately 30 degrees. In another preferred embodiment, where the insert 130 is utilized in pumping operations in the earth's southern hemisphere, the ribs 140 extend upwardly from the base 142 to the cradle 136 in a counterclockwise rotational direction at approximately 30 degrees. This clockwise rotational orientation of the ribs in the northern hemisphere and counterclockwise rotational orientation of the ribs in the southern hemisphere directs the pumped fluid to correspond with the Coriolis Effect caused by the earth's rotation. It should be understood that the orientation of the ribs 140 may deviate from these configurations, as may be needed depending on the conditions and configurations where the insert 130 is employed.

As seen in this embodiment, the ribs 140 may protrude from the exterior of the cradle 136. Adjacent ribs 140 define lateral channels 170 therebetween. As seen in this embodiment, preferably, the width of the channels 170 is greater than the width of the ribs 140. In one embodiment, the channels 170 may have a width that is approximately five times greater than a width of the ribs 140. The channels 170 provide a passageway for fluid that is being pumped. Preferably, and as seen in this embodiment, the ribs 140, and accordingly the channels 170, are angled, thereby providing an overall radial configuration of the insert 130. In this way, as compared with prior art valve cages, a more laminar flow of fluid may be accomplished. This allows fluid to have passage through a space that is greater than a width of a conventional seat opening 88 (see FIGS. 7-8), thereby providing improved passage through the valve cage 10, compared with prior art valve cages. In a preferred embodiment, three ribs 140 are employed, but a different number of ribs 140 could be used, as desired. Preferably, as shown in this embodiment, the ribs 140 are equidistantly spaced apart. In this embodiment, the lower portion 160 of each rib 140 has a curved configuration where each rib 140 meets with an upper surface 166 of the base 142. However, it should be understood that the lower portion 160 of each rib can have a straight configuration, as may be desired. Preferably, the interior surface 161 of each rib 140 (as shown in FIGS. 9, 10, and 12, for example) has a concave curvature that is configured to correspond to the curvature of the ball 80.

The base 142, as seen in this embodiment, is substantially ring-shaped. The base 142 can include an outer diameter 162, an interior diameter 164, an upper surface 166, and a lower surface 167. The lower surface 167 of the base 142 is adapted to abut the upper surface 26 of the rim 24 of the housing 12 (see FIG. 7). Preferably, the height of the base 142 is less than the height of the cradle 136. Further, as seen in this embodiment, the height of the base 142 can be slightly less than the height of the upper ring 138. During pumping operations, when the ball 80 is released from the shoulder 150 of the cradle 136, the ball 80 should fall straight downward onto the seat 82, guided by the insert 130. This allows for faster seating of the ball 80 compared with prior art designs, thereby reducing pump stroke loss and providing for more efficient pumping.

As shown in the embodiment in FIGS. 9 and 10, for example, preferably the cradle 136 has an exterior diameter that is less than an exterior diameter of the base 142. Further, preferably the cradle 136 has an interior diameter that is less than an interior diameter of the base 142. In this way, the interior diameters of the insert 130 from the interior diameter 164 of the base 142 through the interior diameter of the cradle 136 have an overall tapered configuration. Coupled with the angling of the ribs 140, this tapering is helpful particularly when solids begin to accumulate on the ball 80 during pumping operations. In this regard, even when solids accumulate on the ball 80, the ball 80 should fall freely back onto the seat 82. Further, the ball 80 makes contact with the ribs 140. With the angling of the ribs 140, as the ball 80 falls from the direction of the cradle 136 to the seat 82, the point of contact of the ball 80 with the ribs 140 changes, helping to prevent solids from accumulating, and thereby, from causing the ball 80 to stick. This is an advantage over typical prior art valve cages in which the interior diameters of the inserts thereof are not tapered and do not have angled ribs. With such typical prior art valve cages, solids are permitted to stack up during pumping operations and eventually wedge themselves against the ball 80, thereby preventing the ball 80 from reseating.

Regarding the exterior dimensions of the insert 130, as shown in the embodiments in FIGS. 9, 10 and 13, for example, preferably the upper ring 138 has an outer diameter 152 that is the same as an outer diameter 162 of the base 142. Further, preferably the intermediate portion 158 of each rib 140 is flush with the outer diameter 152 of the upper ring 138 and the outer diameter 162 of the base 142. In this way, the exterior dimensions of the insert 130 from the upper ring 138 to the base 142 are substantially uniform. This further facilitates the insert 130 being held in position horizontally within the housing 12, since the exterior portions of the upper ring 138, ribs 140, and base 142 can abut interior portions of the housing 12.

When the insert 130 is employed in the valve cage 10 that is configured as a traveling valve, the shoulder 150 of the cradle 136 retains the ball 80 when the pump is in a downward motion. This allows the ball 80 to be held calmly in position, thereby allowing fluid to pass freely through channels 170 and 168 and around the ball 80 with ease. With the ball 80 being held calmly in position, violent action of the ball 80 is eliminated, thereby obviating a need for a hard liner to be included in the valve cage 10, unlike typical prior art valve cages. During pumping operations, when the pump is in an upward motion and the ball 80 has been released from the shoulder 150 of the cradle 136, fluid that is being pumped may pass through open area 148 and outward through port 146.

When the insert 136 is employed in the valve cage 10 that is configured as a standing valve, during pumping operations, when the pump is in an upward motion, the ball 80 moves upward into the shoulder 150 of the cradle 136, and the shoulder 150 retains the ball 80. This allows the ball 80 to be held calmly in position, thereby allowing fluid to pass freely through channels 170 and 168 and around the ball 80 with ease. With the ball 80 being held calmly in position, violent action of the ball 80 is eliminated, thereby obviating a need for a hard liner to be included in the valve cage 10, unlike typical prior art valve cages. During pumping operations, when the pump is in a downward motion, the ball 80 is released from the shoulder 150 of the cradle 136, and fluid that is being pumped may pass through open area 148 and outward through port 146.

As discussed above, the valve cage 10 can be incorporated into an overall valve cage assembly 100. Referring now to FIGS. 7-8, an exemplary valve cage assembly 100 in accordance with one aspect of the present disclosure is provided. The valve cage assembly 100 can be composed of a hardened material, such as carbide, an alloy or some other suitable material capable of withstanding conditions present in typical oil well environments. The valve cage assembly 100 can generally include the following outer components: an end cap 102 and a seat plug 122 with a valve cage 10 positioned therebetween. In this embodiment, the valve cage assembly 100 can have a substantially longitudinal configuration incorporating the end cap 102, valve cage 10, and seat plug 122 which, when coupled together as discussed further herein, form a one-piece structure. While the embodiment shown in FIGS. 7 and 8 includes insert 30 positioned in the housing 12 of the valve cage 10, as previously noted, insert 130 can be used as an alternative to the insert 30. Thus, the discussion below regarding insert 30 being part of the overall valve cage assembly 100 applies to insert 130, as well.

The end cap 102, valve cage 10, and seat plug 122 can generally have outer diameters that are equal to one another, such that the overall outer diameter of the valve cage assembly 100 is substantially uniform. The valve cage assembly 100 can be substantially tubular, having a longitudinal channel 18 running therethrough. The longitudinal channel 18 can allow the flow of pumped fluids therethrough. Generally, each of the outer components of the valve cage assembly 100 are tubular in structure and have an interior hollow portion.

Still referring to FIGS. 7 and 8, the end cap 102 will be discussed in further detail. The end cap 102 can generally comprise a north end 104, a south end 106, and a longitudinal channel 18 running therethrough. The north end 104 can include a threaded region 108 such that the end cap 102 can be coupled to a southern end of one of various pump components known to those of skill in the relevant art. The south end 106 can include a threaded region 110 configured to correspond to the threaded region 20 of the housing 12, such that the end cap 102 can be coupled to the north end 14 of the valve cage 10. When so coupled, end cap 102 holds insert 30 in position in the housing 12, as seen in FIG. 7. (Similarly, when insert 130 is utilized instead of insert 30, end cap 102 holds insert 130 in position in housing 12 when end cap 102 and valve cage 10 are coupled.) The threaded regions 108 and 110 may comprise either male or female threading configurations, as desired, as long as they correspond to the configurations of the threaded regions to which they are configured to be coupled. In a preferred embodiment, a portion of south end 106 below threaded region 110 has an outer diameter that is less than an outer diameter of threaded region 106. In this way, south end 106 is configured to mate with a portion of an O-ring component 114, as further discussed herein. The end cap 102 can further include a shoulder 112. In this embodiment, shoulder 112 is positioned proximate threaded region 110. Shoulder 112 is configured to abut the north end 14 of valve cage 10 when end cap 102 and valve cage 10 are coupled.

Continuing with FIGS. 7 and 8, valve cage assembly 100 can further include an O-ring component 114. O-ring component 114 can include an upper surface 116, a rim 118, and a lower surface 120. An upper, interior portion of O-ring component 114 proximate its upper surface 116 is configured to mate with an outer portion of end cap 102 proximate the south end 106 of end cap 102. When so mated, rim 118 abuts the south end 106 of end cap 102, as seen in FIG. 7. Further, lower surface 120 of O-ring component 114 is configured to abut upper surface 53 of upper ring 38 of insert 30 when valve cage assembly 100 is fully assembled, as seen in FIG. 7. An O-ring component 114 positioned between end cap 102 and insert 30 can be useful for helping to cushion the insert 30 from the end cap 102 due to forces exerted during pumping operations, thereby prolonging the life of the insert 30. While in a preferred embodiment the insert 30 abuts O-ring component 114, it should be understood that it would be possible for the O-ring component 114 to be omitted from the assembly 100, with insert 30 permitted to directly abut end cap 102.

Similarly, when insert 130 is utilized instead of insert 30, lower surface 120 of O-ring component 114 is configured to abut upper surface 153 of upper ring 138 of insert 130 when valve cage assembly 100 is fully assembled. An O-ring component 114 positioned between end cap 102 and insert 130 can be useful for helping to cushion the insert 130 from the end cap 102 due to forces exerted during pumping operations, thereby prolonging the life of the insert 130. While in a preferred embodiment the insert 130 abuts O-ring component 114, it should be understood that it would be possible for the O-ring component 114 to be omitted from the assembly 100, with insert 130 permitted to directly abut end cap 102.

Continuing with FIGS. 7 and 8, valve cage assembly 100 can further include ball 80 and seat 82, which are configured to be positioned within housing 12 of valve cage 10. Seat 82 can include an upper surface 84, a lower surface 86, and an opening 88. When positioned in housing 12, upper surface 84 of seat 82 is configured to abut lower surface 28 of rim 24. Ball 80 is configured to rest on seat 82, with a portion of ball 80 resting within seat opening 88 (as shown in FIG. 7) during an upstroke of the pump or when the pump is stationary.

Continuing with FIGS. 7 and 8, the seat plug 122 will be discussed in further detail. The seat plug 122 can generally comprise a north end 124, a south end 126, and a longitudinal channel 18 running therethrough. The north end 124 can include a threaded region 128 configured to correspond to the threaded region 22 of the housing 12, such that the seat plug 122 can be coupled to the south end 16 of the valve cage 10. The threaded region 128 may comprise either a male or female threading configuration, as desired, as long as it corresponds to the configuration of the threaded region 22. The seat plug 122 can further include a shoulder 129 juxtaposed between threaded region 128 and south end 126. In a preferred embodiment, a portion of north end 124 below threaded region 128 has an outer diameter that is less than a greatest outer diameter of seat plug 122. In this way, a gap 121 is formed between south end 16 of valve cage 10 and shoulder 129 of seat plug 122 when valve cage 10 and seat plug 122 are coupled.

When the insert 30 is positioned in the housing 12, the lower surface 67 of the base 42 abuts the upper surface 26 of the rim 24 of the housing 12. Similarly, when the insert 130 is positioned in the housing 12, the lower surface 167 of the base 142 abuts the upper surface 26 of the rim 24 of the housing 12. Further, when the seat 82 is positioned in the housing 12, the upper surface 84 of the seat 82 abuts the lower surface 28 of the rim 24. Thus, once the seat plug 122 is coupled to the valve cage 10, a tight seal is created, which prevents fluid from washing by during pumping operations and leaking.

It should be noted that according to one embodiment, insert 30 or insert 130 can be utilized in valve cage assemblies where end cap 102 is omitted, or where end cap 102 is not used to hold insert 30 or insert 130 in place. In this regard, inserts 30 and 130 can be pressed into the housing 12 or a conventional valve cage housing and held in place by an interference fit, forming a one-piece structure. Further, inserts 30 and 130 can be positioned in the housing 12 or a conventional valve cage housing by means of sonic welding or the like, utilizing methods known to those of skill in the art. In these ways, the insert 30 or insert 130 can be configured as an intricate component of the housing 12 or a conventional valve cage.

Referring to FIG. 7, the valve cage 10 can be seen with a ball 80 and seat 82 positioned therein. During pumping operations, when the pump is on an upstroke, the ball 80 would rest on the seat 82, as shown. During this time, when the insert 30 is utilized in the valve cage 10, fluid that is being pumped would pass freely in a general upward direction around the ball 80 and through channels 70 and 68 and port 46. When the pump is on a downstroke, the ball 80 would be retained by the cradle 36 at shoulder 50. Similarly, when the insert 130 is utilized in the valve cage 10, fluid that is being pumped would pass freely in a general upward direction around the ball 80 and through channels 170 and 168 and port 146. When the pump is on a downstroke, the ball 80 would be retained by the cradle 136 at shoulder 150. During pumping operations, the overall design of the valve cage 10 enables a zone of relatively low pressure to be created in a center portion of the valve cage 10 and permits high pressure fluid to move around the ball 80. The ball 80 will fall faster onto the seat 82, compared with prior art valve cage designs. As a result, the speed of valve closure is increased, thereby increasing overall effectiveness of the pump. Further, with the substantially parallel angling of the upper ring 38 and the exterior surface of the cradle 36 of the insert 30 (and, similarly, with the substantially parallel angling of the upper ring 138 and the exterior surface of the cradle 136 of the insert 130), a smooth transition is provided for the pumped fluid, which is directed upwardly through the plurality of upper channels 68 of the insert 30 (and upper channels 168 of the insert 130) without the adverse effect of turbulent fluid flow and, thereafter, further upward through the pumping system.

The insert 30 and insert 130 can be formed from multiple components which, when coupled together, form a one-piece assembly. In this regard, the upper ring 38 of the insert 30 can be machined separately from the remaining portions of the insert 30 and then pressed into position at the upper, outer portions 56 of the ribs 40. Similarly, the upper ring 138 of the insert 130 can be machined separately from the remaining portions of the insert 130 and then pressed into position at the upper, outer portions 156 of the ribs 140.

The foregoing description is illustrative of particular embodiments of the invention, but is not meant to be a limitation upon the practice thereof. While embodiments of the disclosure have been described in terms of various specific embodiments, those skilled in the art will recognize that the embodiments of the disclosure may be practiced with modifications without departing from the spirit and scope of the invention.

What is claimed is:

1. An insert for a valve cage of a pumping apparatus comprising, in combination:
   a base portion adapted to abut a rim of the valve cage;
   a cradle portion adapted to releasably retain a ball, wherein the cradle portion is substantially cone-shaped, and wherein the cradle portion includes one circular port centrally positioned proximate a north end of the insert;
   an upper ring, wherein an interior diameter of the upper ring is downwardly angled from an upper surface of the upper ring to a lower portion of the upper ring;
   a plurality of angled ribs, wherein each rib of the plurality of ribs extends rotationally upwards an entire length from the base portion to the cradle portion, the plurality of ribs terminating at the upper surface of the upper ring, wherein the plurality of ribs define lateral channels therebetween; and a plurality of upper channels, wherein each upper channel is defined by an exterior diameter of the cradle portion, the interior diameter of the upper ring, and upper side portions of adjacent ribs;

wherein a greatest exterior diameter of the cradle portion is less than a greatest exterior diameter of the base portion; and wherein a greatest exterior diameter of the upper ring is equal to a greatest exterior diameter of the base portion.

2. The insert of claim 1, wherein the cradle portion includes an annular shoulder positioned circumferentially about an interior region of the cradle portion, wherein the shoulder is adapted to releasably retain a ball.

3. The insert of claim 1, wherein the cradle portion includes a nose region, wherein the nose region tapers upwardly from the plurality of ribs.

4. The insert of claim 1, wherein an exterior surface of the cradle portion is parallel to the interior diameter of the upper ring.

5. The insert of claim 1, comprising three ribs.

6. The insert of claim 1, wherein the plurality of angled ribs extending rotationally upwards an entire length from the base portion to the cradle portion rotate at an angle of 30 degrees.

7. The insert of claim 1, wherein the plurality of angled ribs extending rotationally upwards an entire length from the base portion to the cradle portion rotate clockwise.

8. The insert of claim 1, wherein the plurality of angled ribs have a width smaller than the channels defined therebetween.

9. The insert of claim 1, wherein an interior surface of each rib has a concave curvature.

10. A valve cage for use in a pumping apparatus comprising, in combination:

a housing having a north end and a south end and a channel running therethrough, wherein a first interior portion of the housing proximate the north end includes a first threaded region, a second interior portion of the housing proximate the south end includes a second threaded region, and a third interior portion of the housing includes an annular rim; and an insert adapted to be positioned in the housing, comprising, in combination:

a base portion adapted to abut the rim of the housing, wherein an exterior diameter of the base portion is adapted to abut an interior diameter of the housing;

a cradle portion adapted to releasably retain a ball, wherein the cradle portion is substantially cone-shaped, and wherein the cradle portion includes one circular port centrally positioned proximate a north end of the insert;

an upper ring, wherein an exterior diameter of the upper ring is adapted to abut the interior diameter of the housing, and wherein an interior diameter of the upper ring is downwardly angled from an upper surface of the upper ring to a lower portion of the upper ring;

a plurality of angled ribs, wherein each rib of the plurality of ribs extends rotationally upwards an entire length from the base portion to the cradle portion, the plurality of ribs terminating at an upper surface of the upper ring, wherein the plurality of ribs define lateral channels therebetween; and a plurality of upper channels, wherein each upper channel is defined by an exterior diameter of the cradle portion, an interior diameter of the upper ring, and upper side portions of adjacent ribs;

wherein a greatest exterior diameter of the cradle portion is less than a greatest exterior diameter of the base portion; and wherein a greatest exterior diameter of the upper ring is equal to a greatest exterior diameter of the base portion.

11. The valve cage of claim 10, wherein the cradle portion includes an annular shoulder positioned circumferentially about an interior region of the cradle portion, wherein the shoulder is adapted to releasably retain a ball.

12. The valve cage of claim 10, wherein the cradle portion includes a nose region, wherein the nose region tapers upwardly from the plurality of ribs.

13. The valve cage of claim 10, wherein an exterior surface of the cradle portion is parallel to the interior diameter of the upper ring.

14. The valve cage of claim 10, wherein the plurality of angled ribs extending rotationally upwards an entire length from the base portion to the cradle portion rotate at an angle of 30 degrees.

15. The valve cage of claim 10, wherein the plurality of angled ribs have a width smaller than the channels defined therebetween.

16. The valve cage of claim 10, wherein an interior surface of each rib has a concave curvature.

17. A valve cage assembly comprising, in combination:

a valve cage comprising, in combination:

a housing having a north end and a south end and a channel running therethrough, wherein a first interior portion of the housing proximate the north end includes a first threaded region, a second interior portion of the housing proximate the south end includes a second threaded region, and a third interior portion of the housing includes an annular rim; and an insert adapted to be positioned in the housing, comprising, in combination:

a base portion adapted to abut the rim of the housing, wherein an exterior diameter of the base portion is adapted to abut an interior diameter of the housing;

a cradle portion adapted to releasably retain a ball, wherein the cradle portion is substantially cone-shaped, and wherein the cradle portion includes one circular port centrally positioned proximate a north end of the insert;

an upper ring, wherein an exterior diameter of the upper ring is adapted to abut the interior diameter of the housing, and wherein an interior diameter of the upper ring is downwardly angled from an upper surface of the upper ring to a lower portion of the upper ring;

a plurality of angled ribs, wherein each rib of the plurality of ribs extends rotationally upwards an entire length from the base portion to the cradle portion, the plurality of ribs terminating at an upper surface of the upper ring, wherein the plurality of ribs define lateral channels therebetween; and a plurality of upper channels, wherein each upper channel is defined by an exterior diameter of the cradle portion, an interior diameter of the upper ring, and upper side portions of adjacent ribs;

wherein a greatest exterior diameter of the cradle portion is less than a greatest exterior diameter of the base portion; and wherein a greatest exterior diameter of the upper ring is equal to a greatest exterior diameter of the base portion;
an end cap adapted to be coupled to the north end of the housing;
a ball adapted to be positioned in the housing;
a seat adapted to be positioned in the housing, wherein an upper surface of the seat is adapted to abut a lower surface of the rim; and
a seat plug adapted to be coupled to the south end of the housing.

18. The valve cage assembly of claim 17, further comprising an O-ring component adapted to be positioned in the housing, wherein a lower surface of the O-ring component is adapted to abut an upper surface of the upper ring.

19. The valve cage assembly of claim 17, wherein the cradle portion includes a nose region, wherein the nose region tapers upwardly from the plurality of ribs.

20. An insert for a valve cage of a pumping apparatus comprising, in combination:
a base portion adapted to abut a rim of the valve cage;
a cradle portion adapted to releasably retain a ball, wherein the cradle portion is substantially cone-shaped, wherein the cradle portion includes one circular port centrally positioned proximate a north end of the insert, and wherein the cradle portion includes a nose region;
an upper ring;
a plurality of angled ribs, wherein each rib of the plurality of ribs extends rotationally upwards an entire length from the base portion to the cradle portion, the plurality of ribs terminating at an upper surface of the upper ring, wherein the plurality of ribs define lateral channels therebetween; and
a plurality of upper channels, wherein each upper channel is defined by an exterior diameter of the cradle portion, an interior diameter of the upper ring, and upper side portions of adjacent ribs;
wherein the nose region tapers upwardly from the plurality of ribs;
wherein a greatest exterior diameter of the cradle portion is less than a greatest exterior diameter of the base portion; and
wherein a greatest exterior diameter of the upper ring is equal to a greatest exterior diameter of the base portion.

* * * * *